United States Patent Office 2,812,340
Patented Nov. 5, 1957

2,812,340

METHOD OF PREPARING ACETOACETIC ACID ESTER OF CASTOR OIL

Alfred R. Bader, Milwaukee, Wis., assignor to Pittsburgh Plate Glass Company, Allegheny County, Pa., a corporation of Pennsylvania No Drawing. Application November 12, 1954, Serial No. 468,569

6 Claims. (Cl. 260—405)

This invention relates to a method of forming acetoacetic acid esters of high molecular weight alcohols and it has particular relation to a method of forming acetoacetic acid esters of castor oil.

Heretofore, esters of castor oil and acetoacetic acid have been prepared by ester interchange reaction of castor oil and an ester of acetoacetic acid and a lower alcohol, such as methyl alcohol or ethyl alcohol. Such method is disclosed in an application to Lowell O. Cummings, Henry A. Vogel and Alfred R. Bader, Serial No. 219,900, filed April 7, 1951, now Patent 2,693,484. This reaction proceeds very readily at mild temperatures and in the absence of catalysts to produce castor oil acetoacetate in high yield. The products have utility as plasticizers for nitrocellulose, vinyl resins, and for other important uses.

Castor oil is largely composed of glycerides, such as the triglycerides of ricinoleic acid. The latter is also known as 12-hydroxy-10-octadecenoic acid contains a free hydroxyl in position 12 of the hydrocarbon radical. When castor oil undergoes ester interchange reaction with an ester of acetoacetic acid and a lower monohydric alcohol, this hydroxyl reacts to replace the alcohol residue of the acetoacetic ester thus forming the desired acetoacetic acid ester of castor oil.

This invention is based upon the discovery that the foregoing esters of acetoacetic acid and castor oil can be prepared relatively inexpensively and in high purity by the reaction of castor oil and diketene. The reaction is believed to proceed substantially according to the following equation:

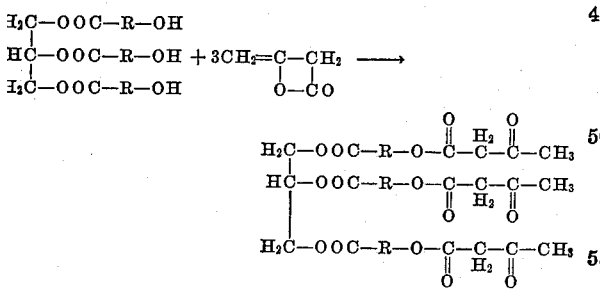

Group R in the equation is the aliphatic chain of ricinoleic acid.

The acetoacetic acid esters of castor oil, as obtained by the interaction of castor oil and diketene, are susceptible of the same uses as the corresponding esters when obtained by the reaction of castor oil and a lower ester of acetoacetic acid and a lower monohydric alcohol as disclosed in the aforementioned Patent 2,693,484. For example, they may be employed as plasticizers of nitrocelluose and vinyl resins. Certain of the derivatives, such as the ammonia derivatives disclosed in the foregoing application, can be used as emulsifying agents. These usages are given merely by way of illustration. Manifestly, the acetoacetic acid ester of castor oil is susceptible of many other uses.

In order to prepare acetoacetic acid esters of castor oil by the reaction of the oil with diketene, the castor oil and the diketene need merely be mixed together and warmed preferably in the presence of a mild catalyst. Suitable catalysts include basic materials such as pyridine and other basic amines, as well as acids such as sulfuric acid, phosphoric acid, or the like. Only very small amounts of catalysts need be employed, and, in fact, the catalyst may be dispensed with entirely, although the reaction proceeds at a slower rate in the absence of a catalyst. A high yield of substantially pure castor oil acetoacetate is readily obtained in this manner.

The pratice of the invention is illustrated by the following example:

Example I

To a solution of 31 grams of cold-pressed castor oil and 0.2 gram of pyridine in 100 cc. toluene, 8.4 grams of diketene was added. The mixture was heated on a steam bath for 16 hours, and stripped in vacuo to give 39 grams of a faintly yellow oil, which is substantially pure castor oil acetoacetate.

The product is substantially the equivalent of that obtained by the ester interchange reaction of castor oil and methyl or ethyl acetoacetate, in accordance with the disclosure of the foregoing application Serial No. 219,900.

The diketene employed in the reaction is relatively inexpensive and the reaction itself is exceedingly simple. The yields are excellent and the product is obtained in a state of high purity.

The following example illustrates the use of castor oil acetoacetate as a plasticizer for nitrocellulose.

Example II

A clear lacquer was prepared comprising a 50 grams solution of ½ second nitrocellulose in mixed solvents (butyl acetate, ethanol, isopropyl acetate and toluene). To the solution were added 10 grams butyl acetate and 10 grams of castor oil acetoacetate. A glass panel was coated with the solution and was baked for 1.5 hours at 100° C. The resultant film was hard and non-brittle.

Castor oil acetoacetate is also a plasticizer for vinyl resins such as polyvinyl acetate, polyvinyl chloride, and the like.

Also the castor oil acetoacetates may be treated with gaseous ammonia to form beta-amino crotonates of castor oil, the latter being useful as emulsifying agents.

I claim:

1. A method of preparing acetoacetic acid ester of castor oil which comprises heating a mixture comprising said oil and diketene until said ester is formed.

2. A method of preparing the acetoacetic acid ester of castor oil which comprises heating a mixture comprising castor oil, diketene and pyridine until said ester is formed.

3. A method of preparing the acetoacetic acid ester of castor oil which comprises heating a mixture comprising castor oil, and diketene in an organic solvent until said ester is formed.

4. A method of preparing the acetoacetic acid ester of castor oil which comprises heating a mixture of castor oil, diketene and pyridine in toluene at about steam bath temperature until said ester is formed.

5. A method of preparing acetoacetic acid esters of castor oil which comprises heating to reaction temperature, a mixture consisting essentially of castor oil and diketene in the presence of an amine reaction catalyst until said ester is formed.

6. A method of preparing acetoacetic acid esters of castor oil which comprises heating at approximately steam bath temperature, a mixture consisting essentially of castor oil and diketene in the presence of an amine catalyst until said ester is formed.

References Cited in the file of this patent

UNITED STATES PATENTS

| | | |
|---|---|---|
| 2,007,968 | Graves | July 16, 1935 |
| 2,167,168 | Boese | July 25, 1939 |
| 2,228,452 | Gleason | Jan. 14, 1941 |
| 2,351,366 | Pohl et al. | June 13, 1944 |
| 2,693,484 | Cummings et al. | Nov. 2, 1954 |